US012767576B2

(12) United States Patent
Dannoux et al.

(10) Patent No.: US 12,767,576 B2
(45) Date of Patent: Oct. 20, 2026

(54) GLASS SAGGING METHODS AND APPARATUS

(71) Applicant: CORNING INCORPORATED, Corning, NY (US)

(72) Inventors: Thierry Luc Alain Dannoux, Avon (FR); Cyril Rémy André Dedieu, Hericy (FR); Ronan Tanguy, Grez sur Loing (FR); Chao Yu, Pittsford, NY (US)

(73) Assignee: Corning Incorporated, Corning, NY (US)

( * ) Notice: Subject to any disclaimer, the term of this patent is extended or adjusted under 35 U.S.C. 154(b) by 138 days.

(21) Appl. No.: 18/635,773

(22) Filed: Apr. 15, 2024

(65) Prior Publication Data

US 2024/0343632 A1 Oct. 17, 2024

Related U.S. Application Data

(60) Provisional application No. 63/459,745, filed on Apr. 17, 2023.

(51) Int. Cl.
*C03B 23/025* (2006.01)

(52) U.S. Cl.
CPC ................................ *C03B 23/0258* (2013.01)

(58) Field of Classification Search
CPC ............................................ C03B 23/025–027
See application file for complete search history.

(56) References Cited

U.S. PATENT DOCUMENTS 2,003,383 A * 6/1935 Miller ................. C03B 23/0256 65/273
5,087,281 A * 2/1992 Kakino ............... C03B 23/0256 65/290
5,178,659 A * 1/1993 Watanabe ........... C03B 23/0235 65/106
9,061,934 B2 6/2015 Bisson et al.
2018/0237326 A1* 8/2018 Fredholm ............. B32B 17/101
2019/0315647 A1* 10/2019 Yu ......................... C03B 23/027
2020/0262733 A1* 8/2020 Burdette ............. C03B 23/0352
2020/0331792 A1 10/2020 Yu

FOREIGN PATENT DOCUMENTS

GB 0869332 A 5/1961
JP 5030771 B2 9/2012
WO 2022/231933 A1 11/2022

* cited by examiner

*Primary Examiner* — Erin Snelting
(74) *Attorney, Agent, or Firm* — Daniel J. Greenhalgh

(57) ABSTRACT

Methods for reforming a glass-based sheet by gravity sagging comprising placing a glass-based sheet over a mold, placing a glass-based patch on a top surface of the glass-based sheet, and heating the glass-based sheet and the glass-based patch to a reforming temperature such that both the glass-based sheet and the glass-based patch deform into the mold cavity under gravitational force. The glass-based patch can be sized and positioned on the top surface of the glass-based sheet to prevent the formation of a wrinkle during the reforming method. The glass-based sheet can be reformed using an apparatus comprising the mold and one or more of the glass-based patches fixed relative to a top surface of the mold.

17 Claims, 7 Drawing Sheets

GLASS SAGGING METHODS AND APPARATUS

CROSS-REFERENCE TO RELATED APPLICATIONS

This application claims the benefit of priority of U.S. Provisional Application Ser. No. 63/459,745, filed on April 17, 2023, the content of which is relied upon and incorporated herein by reference in its entirety.

FIELD

The present disclosure relates to reforming of glass-based articles for use in various industries, for example, consumer electronics, appliances, transportation, architecture, defense, and medicine. In particular, the present disclosure relates to gravity sagging of the glass-based articles.

BACKGROUND

Increasingly, many products include a three-dimensional (3D) glass-based article. Some examples of products including a 3D glass-based article are curved LCD or LED TV screens, smart phones, windows, and windshields. Innovations in the shape of products brings new challenges to the manufacturing processes for 3D parts, and in particular 3D parts that are made of glass, which should have excellent optical properties, along with desirable scratch-resistant and impact-resistant properties.

Therefore, a continuing need exists for methods of manufacturing 3D articles, and in particular 3D glass-based articles, having complex shapes and desirable optical and mechanical properties.

BRIEF SUMMARY

The present disclosure is directed to methods for reforming glass-based sheets using a gravity sagging technique designed to prevent the formation of distortions or deformations (for example, wrinkles) in the glass-based sheet. In embodiments, one or more glass-based patches can be placed on a glass-based sheet before reforming. The presence of the glass-based patches can prevent the formation of the distortions or deformations while allowing the glass-based sheet to reform into shapes having curvatures and properties as described herein.

A first embodiment (1) of the present application is directed to a method for reforming a glass-based sheet, the method comprising placing a glass-based sheet over a mold, the mold comprising a mold cavity, and a top surface defining a top perimeter edge of the mold cavity; placing a glass-based patch on a top surface of the glass-based sheet; and heating the glass-based sheet and the glass-based patch to a reforming temperature such that the glass-based sheet and the glass-based patch deform into the mold cavity under gravitational force, wherein after deforming under the gravitational force, the glass-based patch comprises a first portion disposed over the top surface of the mold and conforming to the shape of the top surface, and a second portion bent over the top perimeter edge of the mold cavity and disposed on the top surface of the glass-based sheet within the mold cavity.

In a second embodiment (2), a bottom surface of the glass-based according to the first embodiment (1) is not fixed to the top surface of the glass-based sheet such that the glass-based sheet and the glass-based patch can deform independently during reforming.

In a third embodiment (3), the first portion of the glass-based patch according to the first embodiment (1) or the second embodiment (2) is mechanically fixed relative to the top surface of the mold.

In a fourth embodiment (4), the first portion of the glass-based patch according to the third embodiment (3) is mechanically fixed relative to the top surface with a wire secured to the mold and the first portion.

In a fifth embodiment (5), the glass-based sheet according to any one of embodiments (1)-(4) is not fixed relative to the top surface of the mold.

In a sixth embodiment (6), a bottom surface of the glass-based patch according to any one of embodiments (1)-(5) comprises a non-stick coating.

In a seventh embodiment (7), a bottom surface of the glass-based patch according to any one of embodiments (1)-(6) comprises a RMS surface roughness of greater than or equal to 10 microns.

In an eighth embodiment (8), the glass-based sheet and the glass-based patch according to any one of embodiments (1)-(7) are formed of the same glass composition.

In a ninth embodiment (9), the glass-based sheet according to any one of embodiments (1)-(7) is formed of a first glass composition comprising a first glass transition temperature and the glass-based patch according to any one of embodiments (1)-(8) is formed of a second glass composition comprising a second glass transition temperature, and the first glass transition temperature is equal to the second glass transition temperature+/−10° C.

In a tenth embodiment (10), the glass-based sheet according to any one of embodiments (1)-(9) is formed of a first glass composition comprising a first coefficient of thermal expansion and the glass-based patch according to any one of embodiments (1)-(9) is formed of a second glass composition comprising a second coefficient of thermal expansion, and the first coefficient of thermal expansion is equal to the second coefficient of thermal expansion+/−$10\times10^{-7}$/° C.

In an eleventh embodiment (11), the glass-based sheet according to any one of embodiments (1)-(10) comprises a thickness ranging from greater than or equal to 0.7 millimeters to less than or equal to 4 millimeters.

In a twelfth embodiment (12) the glass-based patch according to any one of embodiments (1)-(11) comprises a thickness ranging from greater than or equal to 0.7 millimeters to less than or equal to 4 millimeters.

In a thirteenth embodiment (13), in the method according to any one of embodiments (1)-(12), before heating the glass-based sheet, a perimeter edge of the glass-based sheet comprises a first edge portion disposed over the top surface of the mold and a second edge portion disposed over the mold cavity.

In a fourteenth embodiment (14), the glass-based patch according to the thirteenth embodiment (13) is disposed on the top surface of the glass-based sheet at the first edge portion.

In a fifteenth embodiment (15), the glass-based patch according to the thirteenth embodiment (13) is disposed on the top surface of the glass-based sheet at the second edge portion.

In a sixteenth embodiment (16), the method according to any one of embodiments (15) comprises placing a plurality of the glass-based patches on the top surface of the glass-based sheet; and heating the plurality of glass-based patches to the reforming temperature such that each of the glass-based patches deforms into the mold cavity under gravitational force, where after deforming under the gravitational force, each glass-based patch comprises a first portion disposed over the top surface of the mold, and a second portion bent over the top perimeter edge of the mold cavity and disposed on the top surface of the glass-based sheet within the mold cavity.

In a seventeenth embodiment (17), the plurality of glass-based patches according to the sixteenth embodiment (16) are positioned at different locations over the top perimeter edge of the mold cavity.

In an eighteenth embodiment (18), the glass-based patch according to any one of embodiments (1)-(15) comprises a perimeter band disposed over the top perimeter edge of the mold cavity and a hollow center region disposed over the mold cavity.

In a nineteenth embodiment (19), the glass-based patch according to any one of embodiments (1)-(15) or (18) is sized and positioned such that it is disposed on the top surface of the glass-based sheet at a portion of the glass-based sheet that would develop a wrinkle during the reforming method in the absence of the glass-based patch.

In a twentieth embodiment (20), in the method according to any one of embodiments (1)-(19), after deforming under the gravitational force, the glass-based sheet defines a glass-based article comprising a non-developable curved shape defined by a first curved surface and a second curved surface; at least one of the first curved surface and the second curved surface comprises a surface area of 60,000 $mm^2$ or more; and a thickness of the glass-based article, measured as a distance between the first curved surface and the second curved surface in a direction perpendicular to the first curved surface, has a uniformity of +/−75 microns per 1000 $mm^2$ of surface area on the first curved surface.

In a twenty-first embodiment (21), the non-developable curved shape according to the twentieth embodiment (20) comprises a maximum compressive strain shape parameter, as measured between an imaginary central surface disposed between the first curved surface and the second curved surface and an imaginary surface, of greater than or equal to 3.0%.

A twenty-second embodiment (22) of the present application is directed to an apparatus for reforming a glass-based sheet, the apparatus comprising a mold comprising a mold cavity and a top surface defining a top perimeter edge of the mold cavity; a heating device configured to heat the glass-based sheet to a reforming temperature; and a glass-based patch comprising a first portion disposed over the top surface of the mold and fixed relative to the top surface of the mold with a retaining mechanism, and a second portion disposed on the top surface of the glass-based sheet such that the second portion is capable of bending over the top perimeter edge of the mold cavity while in contact with the glass-based sheet and limiting unwanted distortions or deformations at a perimeter edge of the glass-based sheet during a gravity sagging reforming process performed using the apparatus.

In a twenty-third embodiment (23), the glass-based patch according to the twenty-second embodiment (22) comprises a thickness ranging from greater than or equal to 0.7 millimeters to less than or equal to 4 millimeters.

In a twenty-fourth embodiment (24), a bottom surface of the glass-based patch according to the second embodiment (22) or the twenty-third embodiment (23) comprises a non-stick coating, a RMS surface roughness of greater than or equal to 10 microns, or both.

In a twenty-fifth embodiment (25), the glass-based patch according to any one of embodiments (22)-(24) is disposed on the top surface of the glass-based sheet at a portion of the glass-based sheet that would develop a wrinkle during the gravity sagging reforming process in the absence of the glass-based patch.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
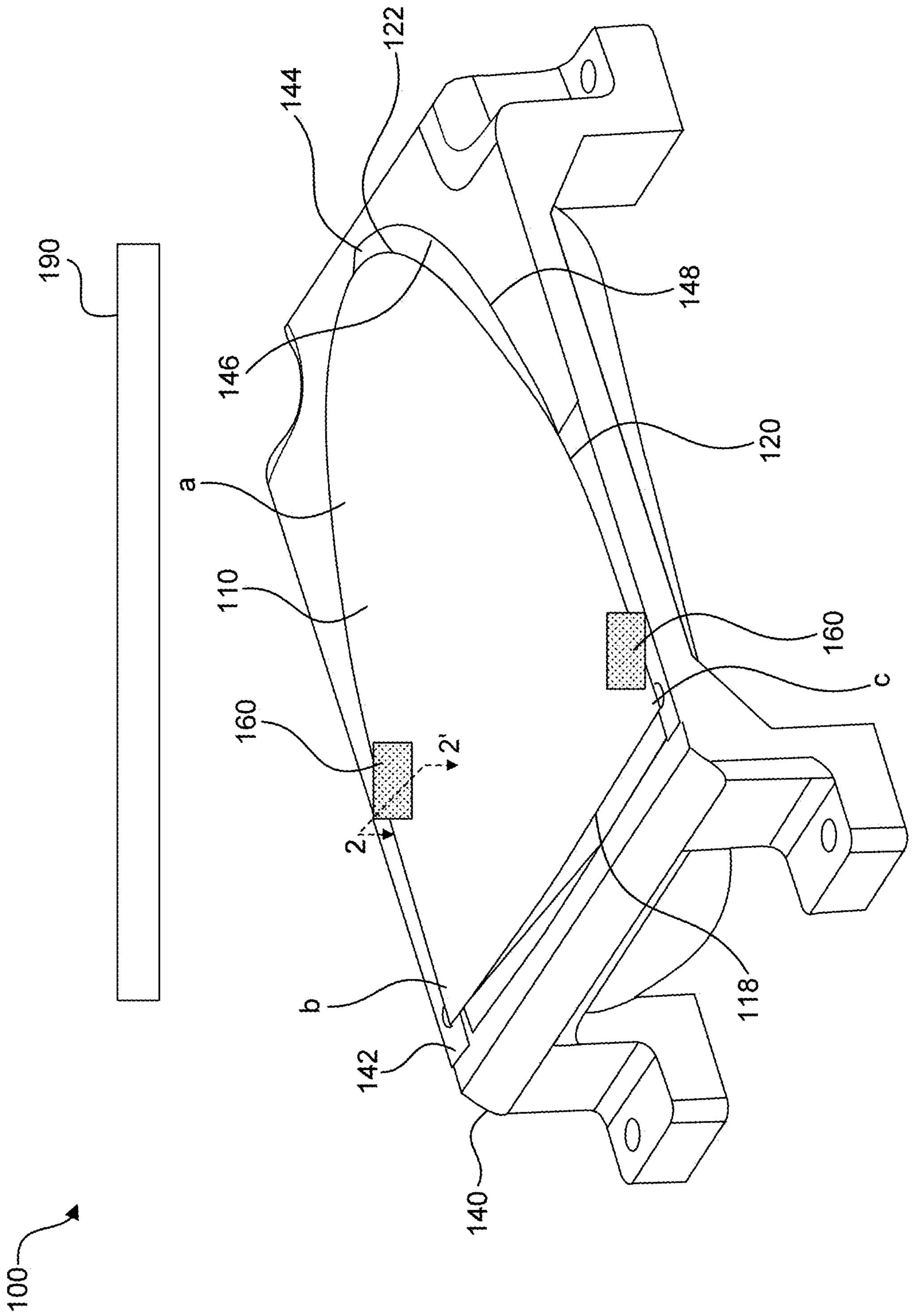
FIG. 1 illustrates an apparatus for reforming a glass-based sheet according to embodiments.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Glass-based articles comprising a non-developable curvature can be used in a variety of applications in which a transparent surface having a non-developable curvature is desired. Glass-based articles comprising a non-developable curvature can provide desirable optical and mechanical properties while also providing the desired curvature.

As used herein, the term "glass-based" is meant to include any material made at least partially of glass, including glass and glass-ceramics. "Glass-ceramics" include materials produced through controlled crystallization of glass. One or more nucleating agents, for example, titanium oxide ($TiO_2$), zirconium oxide ($ZrO_2$), sodium oxide ($Na_2O$), and phosphorus oxide ($P_2O_5$) may be added to a glass-ceramic composition to facilitate homogenous crystallization. In embodiments, a glass-based article or sheet can exhibit an amorphous microstructure and can be substantially free of crystals or crystallites. In other words, the glass-based article or sheet in these embodiments exclude glass-ceramic materials. In other embodiments, a glass-based article or sheet can be a glass-ceramic article or sheet.

As used herein, the terms "non-developable curvature" or "non-zero Gaussian curvature" mean a curvature with crossed radii that cannot be formed with a sheet of paper by bending without also stretching, tearing, or wrinkling the paper. Exemplary non-developable curvatures comprise, but are not limited to, spherical curvatures, spheroid curvatures, partially spheroid curvatures, and three-dimensional saddle curvatures. A "developable curvature" or a "zero Gaussian curvature" means a curvature that can be formed with a sheet of paper by bending alone. Exemplary developable curvatures comprise, but are not limited to, cylindrical and conical curvatures.

As used herein, the term "effective diameter" is utilized to describe the size of a feature, but this term should not be interpreted as requiring the feature to have a circular diameter or shape. Instead, the feature can have a non-circular shape, and in such embodiments, the term "effective diameter" is intended to refer to the maximum cross-sectional dimension of the shape. For example, the "effective diameter" of a feature having an elliptical cross-sectional shape would be the length of the major axis of the elliptical shape.

As used herein, "disposed on" means that a first component is in direct contact with a second component. In other words, if a first component is disposed on a second component, there are no components disposed between the first component and the second component. If a first component is described as "disposed over" a second component, other components may or may not be present between the first component and the second component. A first component described as "disposed on" or "disposed over" a second component does not imply that the first component and the second component were assembled in any particular order. Unless specified otherwise, the first component and the second component can be assembled in any order.

As used herein, the term coefficient of thermal expansion or "CTE" refers to the coefficient of thermal expansion of the glass composition averaged over a temperature range from 20° C. to 300° C. Unless specified otherwise, a coefficient of thermal expansion for a layer is expressed in terms of $10^{-7}$/° C. and is determined using a push-rod dilatometer in accordance with ASTM E228-11.

As used herein, a "wrinkle" in a glass-based sheet or glass-based article is a local, raised change in curvature not conforming to the curvature around the wrinkle and having a height at least twice the thickness of the glass-based sheet or glass-based article. The raised change in curvature is generally under compressive forces created during gravity sagging. Often a wrinkle will be located at or near a perimeter edge of a glass-based sheet or glass-based article.

Gravity sagging processes described herein facilitate the formation of glass-based articles comprising non-developable curvatures, suitable optical properties, and suitable mechanical properties. The non-developable curved shape can be created while maintaining thickness uniformity in the curved shape and avoiding wrinkling in the glass. By facilitating thickness uniformity and avoiding wrinkling, a non-developable curved shape with desirable optical and mechanical properties can be formed. Moreover, by facilitating thickness uniformity and avoiding wrinkling, a non-developable curved shape having a large convex surface area (e.g., a surface area greater than or equal to 60,000 $mm^2$) can be created without introducing optical or mechanical defects.

Conventional three-dimensional reforming by gravity sagging on a frame is known for reforming glass in some applications. However, reforming of glass sheets to a curved shape having a small radius, a combination of radii, curved edges, and/or complex contour (e.g., a non-developable shape) using conventional sagging techniques is challenging.

The formation of these types of curved shapes using conventional sagging techniques can require the use of mechanisms that tend to create glass wrinkling and/or reformed glass with mechanical or optical defects. Deep Gaussian three-dimensional reforming using conventional sagging techniques can result in a high level of glass deformation, which can be problematic for optical and mechanical properties.

Conventional sagging techniques can also result in a high level of compressive strain in a reformed glass-based article. The level of complexity of a 3D shape can be determined by the strain required to go from the target 3D CAD (computer-aided design) of the shaped part to a flat part. This can be achieved by computer modeling using known modeling software. Typically, a model can determine a strain map for the target 3D part showing areas where tensile strain is required, which means that some level of expansion of the material is needed, and other areas were compressive strain is required, which means that some level of material gathering is needed to go from the 3D part to a flat part. High levels of compressive strain in traditional reforming of flat glass is likely to generate wrinkling type of defects. Relatedly, high levels of tensile strain would require either a long reforming time, a very low material viscosity, or an excessively large force to generate the required level of deformation. As an example, the level of maximum compressive strain observed on the parts made using conventional sagging techniques can be around 0.2% to 0.5%. Conventional sagging or press bending techniques for making curved glass can be unable to create articles having complex curvatures and a maximum compressive strain of less than 1% or even less than 2% without generating unacceptable defects.

Wrinkles in a glass-based article can appear when a glass-based sheet deforms under its own weight in a gravity sagging process and tries to conform to a 3D shape that is curved. In some cases, the wrinkling can occur when compressive stresses or strains develop in the glass-based sheet and exceed a certain value. This wrinkling phenomenon is more likely to occur for larger-sized glass-based sheets and/or thin glass-based sheets (e.g., 4 millimeters or less).

Gravity sagging techniques according to embodiments described herein can create glass-based articles comprising complex curvatures with compressive strains that are greater than shapes that are obtainable with certain existing sagging or press bending techniques can produce without generating glass wrinkling or breakage. That is, embodiments of the present disclosure can be used to re-form glass-based sheets to more complex shapes having higher modelled compressive strains associated therewith without wrinkling or breakage than certain existing techniques. Gravity sagging techniques described herein can comprise reforming a glass-based sheet using one or more glass-based patches that prevent glass wrinkling during deep Gaussian deformation of a glass-based sheet to create a non-developable curved shape. In embodiments, gravity sagging techniques described herein can prevent glass wrinkling during forming of a glass-based sheet to create a non-developable curved shape having a deep Gaussian curvature of $1\times10^{-7}/mm^2$ or more. The one or more glass-based patches can be designed to apply pressure to a glass-based sheet during reforming while also facilitating free movement of the glass-based sheet, thus preventing the formation of wrinkles.

The one or more glass-based patches can be positioned on one or more portions of a glass-based sheet that would wrinkle during a gravity sagging process in the absence of the glass-based patches (holding all other process parameters constant). The one or more glass-based patches can deform with the glass-based sheet during reforming such that the patch(es) apply pressure to portions of the glass-based sheet that would wrinkle during a gravity sagging process in the absence of the patch(es). The glass-based patches are not mechanically fixed (e.g., by an adhesive or mechanical fastener) to the glass-based sheet being reformed. This lack of mechanical fixation allows a glass-based sheet and glass-based patch(es) to conform to a mold under gravitational forces. In embodiments, a bottom surface of the glass-based patch(es) can freely slide relative to a top surface of a glass-based sheet during gravity sagging. In embodiments, a bottom surface of the glass-based patch(es) can deform simultaneously with a top surface of a glass-based sheet during gravity sagging such that the glass-based patch(es) continuously applies pressure on to the top surface during reforming.

The one or more glass-based patches can be fixed relative to the top surface of a mold used to reform a glass-based sheet. By fixing the one or more glass-based patches relative to the top surface, the glass-based patches can, after reforming, have a first portion disposed over the top surface of the mold and a second portion bent over a top perimeter edge of a mold cavity and in contact with the glass-based sheet within the mold cavity. The second portion bent over the top perimeter edge can apply pressure to a portion of the glass-based sheet that would wrinkle during gravity sagging in the absence of the patch. In embodiments, the first portion disposed over the top surface of the mold can comprise a shape that conforms, in whole or in part, to the shape of the top surface. As a result, the glass-based patch may bend over, and apply pressure to, a transition region (e.g., at the top perimeter edge) of the mold, where a surface of the mold transitions from the top surface having a first (e.g., flat) shape to a cavity sidewall having a second (e.g., curved, non-developable) shape. Application of pressure across this transition region can mitigate excess strain on the glass during reformation and prevent the formation of wrinkles or other defects.

In embodiments, the one or more glass-based patches can be formed of a glass composition having the same or similar thermal properties as a glass-based sheet being reformed. In embodiments, the one or more glass-based patches can be formed of a glass composition having a glass transition temperature that is the same or similar to the glass transition temperature of a glass-based sheet being reformed. In embodiments, the one or more glass-based patches can be formed of a glass composition having a coefficient of thermal expansion that is the same or similar to the coefficient of thermal expansion of a glass-based sheet being reformed. In embodiments, the one or more glass-based patches and a glass-based sheet being reformed can be formed of the same glass composition. By forming the one or more glass-based patches of a glass composition having the same or similar thermal properties as a glass-based sheet being reformed, the glass-based patches can deform simultaneously with the glass-based sheet during reforming, thus facilitating contact between the glass-based patch(es) and glass-based sheet during reforming.

In embodiments, the one or more glass-based patches can have a thicknesses that is the same or similar to the thickness of a glass-based sheet being reformed. By designing the glass-based patches to have a thickness the same as or similar to the thickness of a glass-based sheet being reformed, simultaneous deformation of the glass-based patches and a glass-based sheet during reforming can be facilitated, which thereby facilitates contact between the glass-based patch(es) and glass-based sheet during reforming. When constructed of glass-based materials having similar thickness, coefficient of thermal expansion, and/or viscosity at temperatures to which they are heated during reforming, the glass-based patches and glass-based sheet may beneficially deform in similar ways throughout the reformation process, facilitating continuous contact between the glass-based sheet and the glass-based patch, which may aid in reducing wrinkles in the reformed glass-based sheet.

In embodiments, a bottom surface of the one or more glass-based patches can comprise a non-sticking coating configured to prevent undesired sticking between a glass-based patch and a glass-based sheet during reforming. In embodiments, a bottom surface of the one or more glass-based patches can comprise a surface roughness configured to prevent undesired sticking between a glass-based patch and a glass-based sheet during reforming. For example, in embodiments, a bottom surface of the one or more glass-based patches can comprise a root mean square (RMS) surface roughness of greater than or equal to 10 microns. By preventing undesired sticking, relative sliding between the patch(es) and a glass-based sheet can be facilitated, which in turn, can prevent or inhibit the formation of optical defects in a glass-based sheet during reforming.

Gravity sagging techniques described herein offer one or more of the following advantageous features. (1) Complex 3D shapes can be achieved without the need to apply vacuum pressure within the mold to achieve a desired shape. This eliminates a need to form a proper seal between the glass and mold for application of vacuum pressure. The techniques described herein may utilize lower forming temperatures than vacuum-based techniques, which can help enhance the optical quantity of a reformed glass-based article. For example, desired thickness uniformity, compressive strain shape parameter, and/or optical distortion properties of the glass-based article can be achieved. (2) A net shape contour of a glass-based article can be defined initially such that the reformed glass-based article achieves a target shape and does not require an extraction step that includes cutting away excess glass material after reforming. Vacuum-based techniques can utilize oversized preforms that require cutting away excess glass to obtain the final glass-based article. Gravity sagging techniques described herein can utilize preforms that are cut to produce the desired glass-based article before reforming, thereby reducing glass waste created by an extraction step. (3) Multiple glass sheets can be reformed simultaneously.

FIG. 1 illustrates an apparatus 100 for reforming a glass-based sheet 110 using gravity sagging methods according to embodiments. Apparatus 100 comprises a mold 140 comprising a mold cavity 144 and a top surface 142 defining a top perimeter edge 148 of the mold cavity 144. Mold cavity 144 can comprise a shape defined by a mold cavity sidewall 146. Mold cavity 144 can comprise a shape configured to shape glass-based sheet 110 into a glass-based article having a desired shape during a gravity sagging process. In embodiments, during reforming, glass-based sheet 110 deforms into mold cavity 144 under gravitational force. In embodiments, mold cavity sidewall 146 can be made of a non-stick material, for example graphite grade 2020 from Mersen or graphite F100 grade from Poco Graphite Inc.

Figure 2B:
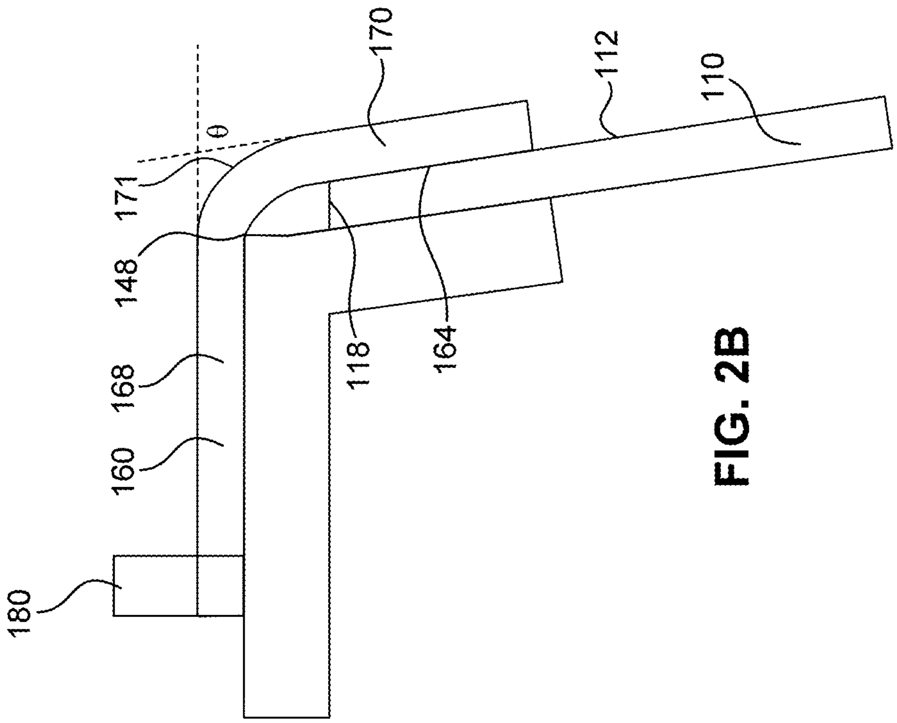
FIG. 2B is a cross-sectional view along the cross-section line 2-2' in FIG. 1 after reforming a glass-based sheet according to embodiments.
Figure 2A:
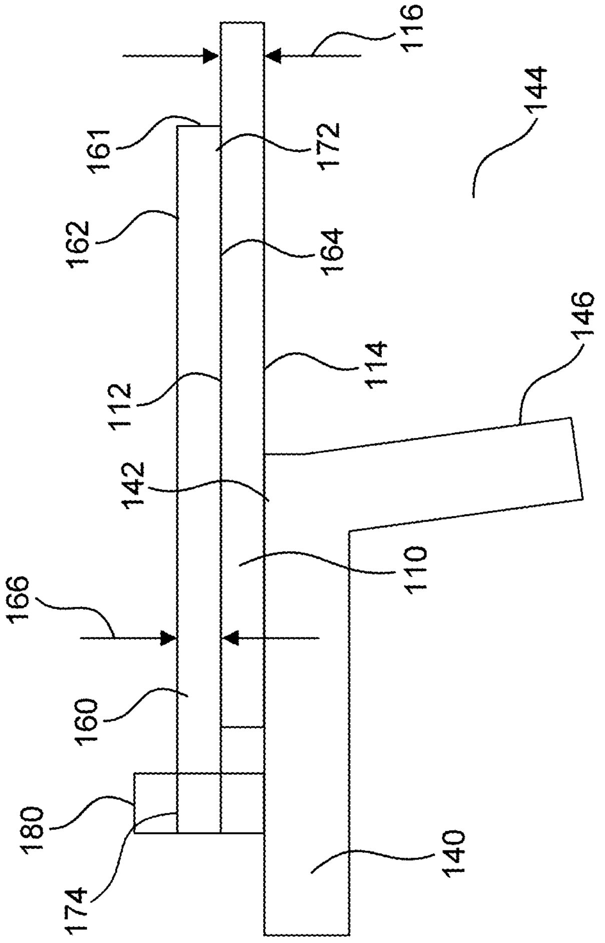
FIG. 2A is a cross-sectional view along the cross-section line 2-2' in FIG. 1 before reforming a glass-based sheet according to embodiments.

As shown for example in FIG. 2A, glass-based sheet 110 comprises a top surface 112, a bottom surface 114 opposite top surface 112, and a thickness 116 measured between top surface 112 and bottom surface 114. Glass-based sheet 110 also comprises a perimeter edge 118 defining a perimeter shape of glass-based sheet 110.

In embodiments, thickness 116 can be less than or equal to 6 millimeters. For example, in embodiments, thickness 116 can range from 0.25 millimeters to 4 millimeters, from 0.5 millimeters to 4 millimeters, from 0.7 millimeters to 4 millimeters, from 1 millimeter to 4 millimeters, from 2 millimeters to 4 millimeters, or within a range having any two of these values as endpoints. In embodiments, thickness 116 can range from 0.1 millimeters to 10 millimeters, from 0.2 millimeters to 10 millimeters, from 0.3 millimeters to 10 millimeters, from 0.4 millimeters to 10 millimeters, from 0.5 millimeters to 10 millimeters, from 0.6 millimeters to 10 millimeters, from 0.7 millimeters to 10 millimeters, from 0.8 millimeters to 10 millimeters, from 0.9 millimeters to 10 millimeters, from 1 millimeter to 10 millimeters, from 1.1 millimeters to 10 millimeters, from 1.2 millimeters to 10 millimeters, from 1.4 millimeters to 10 millimeters, from 1.5 millimeters to 10 millimeters, from 1.6 millimeters to 10 millimeters, from 1.8 millimeters to 10 millimeters, from 2 millimeters to 10 millimeters, from 2.1 millimeters to 10 millimeters, from 2.5 millimeters to 10 millimeters, from 3 millimeters to 10 millimeters, from 4 millimeters to 10 millimeters, from 5 millimeters to 10 millimeters, from 0.1 millimeters to 9 millimeters, from 0.1 millimeters to 8 millimeters, from 0.1 millimeters to 7 millimeters, from 0.1 millimeters to 6.5 millimeters, from 0.1 millimeters to 6 millimeters, from 0.1 millimeters to 5 millimeters, from 0.1 millimeters to 4 millimeters, from 0.5 millimeters to 4 millimeters, from 0.7 millimeters to 4 millimeters, from 0.7 millimeters to 3.5 millimeters, from 0.7 millimeters to 3 millimeters, from 0.7 millimeters to 2.5 millimeters, or from 0.7 millimeters to 2 millimeters, or within a range having any two of these values as endpoints.

In embodiments, glass-based sheet 110 can be a multi-layer glass-based sheet comprising a plurality of stacked glass-based sheets. In such embodiments, the top-most glass-based sheet defines top surface 112 and the bottom-most glass-based sheet defines bottom surface 114. Also in such embodiments, thickness 116 is the total thickness of all the glass-based sheets measured between top surface 112 and bottom surface 114.

Apparatus 100 further comprises one or more heating devices 190 configured to heat glass-based sheet 110 to a reforming temperature. Exemplary heating devices 190 comprise convection heating devices and infrared (IR) heating devices. Heating device(s) 190 heat glass-based sheet 110 to a reforming temperature such that glass-based sheet 110 will deform into mold cavity 144 under gravitational force.

Apparatus 100 also comprises one or more glass-based patches 160. Each glass-based patch 160 can comprise a first portion 168 disposed over top surface 142 of mold 140 and fixed relative to the top surface 142 with a retaining mechanism 180, and a second portion 170 disposed on top surface 112 of glass-based sheet 110. During a reforming method, the second portion 170 of a glass-based patch 160 is capable of bending over top perimeter edge 148 of mold cavity 144 while in contact with glass-based sheet 110. For example, as shown in FIG. 2B, second portion 170 of a glass-based patch 160 is shown as bent over top perimeter edge 148 after reforming glass-based sheet 110. By bending over top perimeter edge 148 of mold cavity 144 while in contact with glass-based sheet 110, glass-based patch(es) 160 can limit unwanted distortions or deformations (e.g., wrinkles) forming in glass-based sheet 110 during a gravity sagging reforming process performed using apparatus 100. In embodiments, the top surface 142 and the mold cavity sidewall 146 can make up a contact surface that contacts the glass-based sheet 110 during reformation thereof. The top perimeter edge 148 can be a portion of the contact surface that transitions in shape. In the depicted example, the top surface 142 is substantially planar, while the surface of the mold cavity sidewall 146 is curved to a suitable shape. As shown in FIG. 2A, before reforming, the top surface 142 can extend substantially (e.g., within 10° of) parallel or parallel to the bottom surface 114, while the mold cavity sidewall 146 can extend at a substantial angle (e.g., greater than or equal to 20°, greater than or equal to 30°, greater than or equal to 45°, greater than or equal to) 60° relative to the bottom surface 114. The top perimeter edge 148 can comprise a corner marking the point of shape transition.

In embodiments, the one or more glass-based patches 160 can be disposed on top surface 112 of a glass-based sheet 110 at a portion of the glass-based sheet 110 that would develop a wrinkle during a gravity sagging reforming process in the absence of the glass-based patch(es) 160. In embodiments, a portion of the glass-based sheet 110 that would develop a wrinkle during the gravity sagging reforming process in the absence of a glass-based patch can be located at perimeter edge 118 of glass-based sheet 110. In embodiments, the location of one or more glass-based patches 160 disposed on top surface 112 of a glass-based sheet 110 can be based on a finite element analysis modeled reformed glass-based article, for example modeled reformed glass-based article 500 discussed herein.

Retaining mechanism 180 can comprise any mechanical fastening device capable of mechanically fixing the first portion 168 of a glass-based patch 160 relative to top surface 142 of mold 140 and retaining the first portion 168 over top surface 142 during reforming. Suitable mechanical fastening devices comprise but are not limited to, clamps, wires, weights, adhesives, friction fit devices, screws, and bolts. In embodiments, a glass-based patch 160 can comprise an opening 174 that receives retaining mechanism 180 to secure retaining mechanism 180 to the first portion 168 of the glass-based patch 160. In embodiments, the first portion 168 of a glass-based patch 160 can be mechanically fixed relative to top surface 142 of mold 140 with a retaining mechanism 180 comprising a wire secured to mold 140 and the first portion 168 of the glass-based patch 160. In such embodiments, the wire can be looped through opening 174 in glass-based patch 160.

The one or more glass-based patches 160 comprise a top surface 162, a bottom surface 164 opposite top surface 162, and a thickness 166 measured between top surface 162 and bottom surface 164.

In embodiments, thickness 166 can be less than or equal to 6 millimeters. For example, in embodiments, thickness 166 can range from 0.25 millimeters to 4 millimeters, from 0.5 millimeters to 4 millimeters, from 0.7 millimeters to 4 millimeters, from 1 millimeter to 4 millimeters, from 2 millimeters to 4 millimeters, or within a range having any two of these values as endpoints. In embodiments, thickness 166 can range from 0.1 millimeters to 10 millimeters, from 0.2 millimeters to 10 millimeters, from 0.3 millimeters to 10 millimeters, from 0.4 millimeters to 10 millimeters, from 0.5 millimeters to 10 millimeters, from 0.6 millimeters to 10 millimeters, from 0.7 millimeters to 10 millimeters, from 0.8 millimeters to 10 millimeters, from 0.9 millimeters to 10 millimeters, from 1 millimeter to 10 millimeters, from 1.1 millimeters to 10 millimeters, from 1.2 millimeters to 10 millimeters, from 1.4 millimeters to 10 millimeters, from 1.5 millimeters to 10 millimeters, from 1.6 millimeters to 10 millimeters, from 1.8 millimeters to 10 millimeters, from 2 millimeters to 10 millimeters, from 2.1 millimeters to 10 millimeters, from 2.5 millimeters to 10 millimeters, from 3 millimeters to 10 millimeters, from 4 millimeters to 10 millimeters, from 5 millimeters to 10 millimeters, from 0.1 millimeters to 9 millimeters, from 0.1 millimeters to 8 millimeters, from 0.1 millimeters to 7 millimeters, from 0.1 millimeters to 6.5 millimeters, from 0.1 millimeters to 6 millimeters, from 0.1 millimeters to 5 millimeters, from 0.1 millimeters to 4 millimeters, from 0.5 millimeters to 4 millimeters, from 0.7 millimeters to 4 millimeters, from 0.7 millimeters to 3.5 millimeters, from 0.7 millimeters to 3 millimeters, from 0.7 millimeters to 2.5 millimeters, or from 0.7 millimeters to 2 millimeters, or within a range having any two of these values as endpoints.

In embodiments, the one or more glass-based patches 160 can be a multi-layer glass-based patch comprising a plurality of stacked glass-based patches. In such embodiments, the top-most glass-based patch defines top surface 162 and the bottom-most glass-based patch defines bottom surface 164. Also in such embodiments, thickness 166 is the total thickness of all the glass-based patches measured between top surface 162 and bottom surface 164.

In embodiments, thickness 116 and 166 can be the same. In embodiments, thickness 116 can be equal to thickness 166+/−10%. For example, if thickness 116 is 1 millimeter, thickness 166 can range from 0.9 millimeters to 1.1 millimeters. In embodiments, thickness 116 can be equal to thickness 166+/−5%. In embodiments, thickness 116 can be equal to thickness 166+/−20%. In embodiments, thickness 116 can be equal to thickness 166+/−25%. In embodiments, thickness 116 can be equal to thickness 166+/−0.1 millimeters. For example, if thickness 116 is 2 millimeters, thickness 166 can range from 1.9 millimeters to 2.1 millimeters. In embodiments, thickness 116 can be equal to thickness 166+/−0.2 millimeters. In embodiments, thickness 116 can be equal to thickness 166+/−0.5 millimeters.

In embodiments, perimeter edge 161 of glass-based patch(es) 160 can be beveled at top surface 162, bottom surface 164, or both.

In embodiments, bottom surface 164 of glass-based patch(es) 160 can comprise a non-stick coating 172. Suitable non-stick coatings comprise, but are not limited to, a carbon soot coating, a carbon particle spray coating, and a boron nitride coating.

In embodiments, bottom surface 164 of glass-based patch(es) 160 can comprise a RMS surface roughness of greater than or equal to 10 microns. In embodiments, bottom surface 164 of glass-based patch(es) 160 can comprise a RMS surface roughness of greater than or equal to 10 microns to less than or equal 50 microns. Unless specified otherwise, RMS surface roughness is measured using a non-contact optical surface roughness measurement technique with an optical profilometer, for example a ZYGO™ 3D optical profilometer.

In embodiments, bottom surface 164 of glass-based patch(es) 160 can comprise a RMS surface roughness of greater than or equal to 10 microns and a non-stick coating 172.

In embodiments, the glass-based sheet 110 and the one or more glass-based patches 160 can be formed of the same glass composition. For example, the glass-based sheet 110 and the one or more glass-based patches 160 can both be formed of a glass composition comprising the same mol % of a plurality of oxides defining the composition.

In embodiments, glass-based sheet 110 can be formed of a first glass composition comprising a first glass transition temperature and glass-based patch(es) 160 can be formed of a second glass composition comprising a second glass transition temperature, where the first glass transition temperature is equal to the second glass transition temperature+/−10° C. Unless specified otherwise, the glass transition temperature of a glass composition is measured according to ASTM C1350M-96 (Standard Test Method for Measurement of Viscosity of Glass Between Softening Point and Annealing Range (Approximately 108 Pa's to Approximately 1013 Pa's) by Beam Bending). In embodiments, glass-based sheet 110 can be formed of a first glass composition comprising a first glass transition temperature and glass-based patch(es) 160 can be formed of a second glass composition comprising a second glass transition temperature less than or equal to the first glass transition temperature.

In embodiments, glass-based sheet 110 can be formed of a first glass composition comprising a first coefficient of thermal expansion and the glass-based patch(es) 160 can be formed of a second glass composition comprising a second coefficient of thermal expansion, where the first coefficient of thermal expansion is equal to the second coefficient of thermal expansion+/−$10\times10^{-7}$/° C.

In embodiments, glass-based sheet 110 can be reformed according to a method as described herein. The method can comprise placing glass-based sheet 110 over mold 140, placing one or more glass-based patches 160 on top surface 112 of the glass-based sheet 110, and heating glass-based sheet 110 and the one or more glass-based patches 160 to a reforming temperature such that glass-based sheet 110 and the one or more glass-based patches 160 deform into mold cavity 144 under gravitational force. In embodiments, the reforming temperature can be greater than or equal to 500° C. In embodiments, the reforming temperature can range from 500° C. to 700° C., 600° C. to 700° C., or 700° C. to 800° C.

After deforming under gravitation force, glass-based sheet 110 can be reformed into a glass-based article as described herein, for example glass-based article 700.

After deforming under gravitational force, and as shown for example in FIG. 2B, the one or more glass-based patches 160 can comprise a first portion 168 disposed over top surface 142 of mold 140. In embodiments, the first portion 168 can comprise a shape that conforms to the shape of the top surface 142. In such embodiments, all or part of the first portion 168 can comprise a shape that is the same as the shape of the top surface 142, such that the all or part the first portion 168 comprises a surface profile that is parallel to the surface profile of top surface 142. In embodiments, after reforming, the first portion 168 of the one or more glass-based patches 160 can be disposed on top surface 142 of mold 140.

Further, after deforming under gravitational force, the one or more glass-based patches 160 can comprise a second portion 170 bent over top perimeter edge 148 of mold cavity 144 and disposed on top surface 112 of glass-based sheet 110 within mold cavity 144. In embodiments, bottom surface 164 of a glass-based patch 160 at second portion 170 can be in direct contact with top surface 112 of glass-based sheet 110 within mold cavity 144. In embodiments, after deforming under gravitational force, second portion 170 of a glass-based patch 160 can conform to the shape of glass-based sheet 110 where second portion 170 is disposed on top surface 112 of glass-based sheet 110 within mold cavity 144. In such embodiments, at least part of the second portion 170 can comprise a surface profile that is parallel to the surface profile of top surface 112.

In embodiments, second portion 170 comprises a bent portion 171 bent around top perimeter edge 148. In embodiments, bent portion 171 can be bent at an angle (0) relative to top surface 162 of first portion 168. In embodiments, the angle (θ) can be greater than or equal to 10°. In embodiments, the angle (θ) can be greater than or equal to 10° to less than or equal to 90°.

In embodiments, the bottom surface 164 of the one or more glass-based patches 160 is not fixed to top surface 112 of glass-based sheet 110 such that glass-based sheet 110 and the glass-based patch 160 can deform independently during reforming. In other words, the bottom surface 164 of the one or more glass-based patches 160 and top surface 112 of glass-based sheet 110 can slide relative to each other during reforming within mold cavity 144. In embodiments, the bottom surface 164 of the one or more glass-based patches 160 is not fixed to top surface 112 of glass-based sheet 110 with an adhesive or another mechanical fastening mechanism.

In embodiments, as described herein, first portion 168 of one or more glass-based patches 160 is mechanically fixed relative to top surface 142 of mold 140. Glass-based sheet 110 is not fixed relative to top surface 142 of mold 140, either directly or indirectly via a fastening mechanism. As such, contrary to glass-based patch(es) 160, the entirety of glass-based sheet 110 can be free to deform into mold cavity 144 during reforming.

In embodiments, before heating glass-based sheet 110 to a reforming temperature, perimeter edge 118 of glass-based sheet 110 can comprise a first edge portion 120 disposed over the top surface 142 of the mold 140 and a second edge portion 122 disposed over mold cavity 144. In embodiments, a glass-based patch 160 can be disposed on top surface 112 of glass-based sheet 110 at the first edge portion 120. In embodiments, a glass-based patch 160 can be disposed on top surface 112 of glass-based sheet 110 at the second edge portion 122. In embodiments, a glass-based patch 160 can be disposed on top surface 112 of glass-based sheet 110 at the first edge portion 120 and the second edge portion 122.

In embodiments, methods of reforming glass-based sheet 110 as described herein can comprise placing a plurality of glass-based patches 160 on top surface 112 of glass-based sheet 110. In such embodiments, the method can comprise heating the plurality of glass-based patches 160 to the reforming temperature such that each of the glass-based patches 160 deforms into mold cavity 144 under gravitational force. And, after deforming under the gravitational force, each glass-based patch 160 comprises a first portion 168 disposed over top surface 142 of mold 140 and a second portion 170 bent over top perimeter edge 148 of mold cavity 144 and disposed on top surface 112 of the glass-based sheet 110 within mold cavity 144. In such embodiments, the first portion 168 of each patch 160 can comprise a shape that conforms, in whole or in part, to the shape of the top surface 142 over which the first portion is disposed. In embodiments, after reforming, the first portion 168 of each patch 160 can be disposed on top surface 142 of mold.

In embodiments, the plurality of glass-based patches 160 can be positioned at different locations over top perimeter edge 148 of mold cavity 144. In embodiments, the plurality of glass-based patches 160 can be positioned at different locations over top perimeter edge 148 based on a finite element analysis modeled reformed glass-based article, for example modeled reformed glass-based article 500 discussed herein. In embodiments, the plurality of glass-based patches 160 can comprise a number of glass-based patches that is proportional (e.g., corresponds to) to a number of wrinkles that would be present if the glass-based sheet 110 was reformed without the patches (holding all other process parameters constant). In embodiments, in addition to the modelling described herein, a number and arrangement of glass-based patches can be determined by reforming a glass-based sheet without glass-based patches and examining the re-formed glass-based sheet for wrinkles.

Figure 3A:
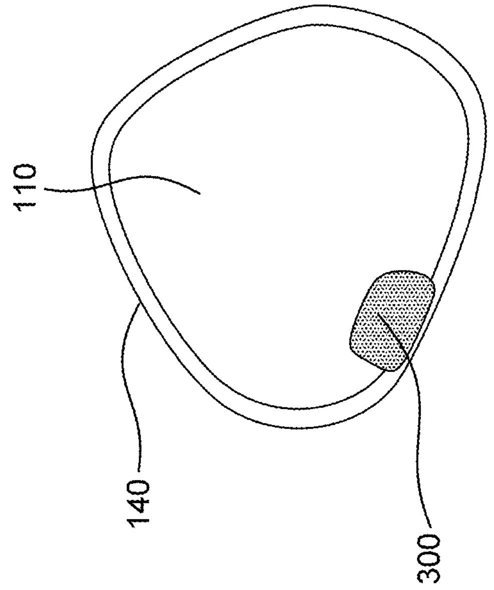
FIGS. 3A-3C illustrate glass-based patches according to embodiments.
Figure 3B:
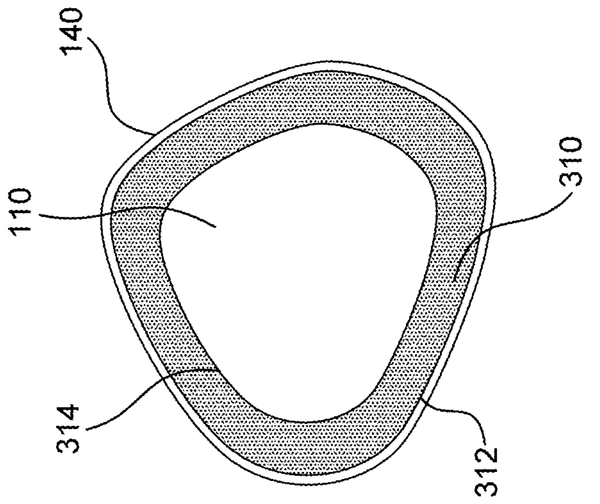
Figure 3C:
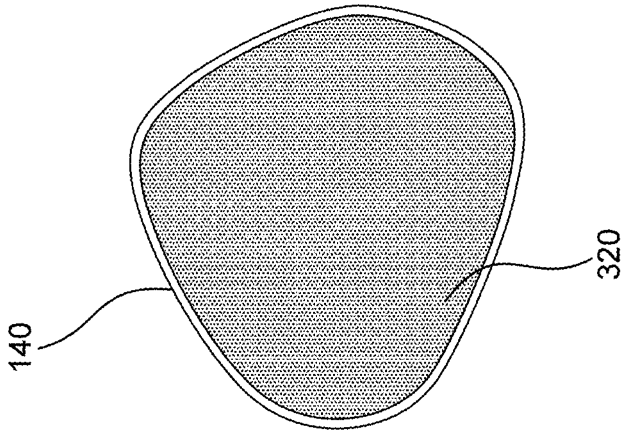

The one or more glass-based patches 160 can comprise any suitable size and shape. FIGS. 3A-3C illustrate various patches 160 according to embodiments.

In embodiments, the one or more glass-based patches 160 can be local glass-based patches 300 sized and shaped to be disposed on top surface 112 of a glass-based sheet 110 at a portion of the glass-based sheet 110 that would develop a wrinkle during a gravity sagging reforming process in the absence of the glass-based patch 300. In embodiments, a portion of the glass-based sheet 110 that would develop a wrinkle during the gravity sagging reforming process in the absence of the glass-based patch 300 can be located at perimeter edge 118 of glass-based sheet 110. In embodiments, a plurality of local glass-based patches 300 can be disposed on top surface 112 of a glass-based sheet 110 at different portions of the glass-based sheet 110 that would develop a wrinkle during the gravity sagging reforming process in the absence of the glass-based patch 300.

In embodiments comprising one or more local glass-based patches 300, the size, shape, and location of patches 300 on top surface 112 of glass-based sheet 110 be determined based on a finite element analysis modeled reformed glass-based article, for example modeled reformed glass-based article 500 discussed herein. In embodiments comprising one or more local glass-based patches 300, the size, shape, and location of patches 300 can be selected such that a patch 300 will cover at least part of an area that would develop a wrinkle during a gravity sagging reforming process in the absence of the glass-based patch 300. In embodiments comprising one or more local glass-based patches 300, the size, shape, and location of patches 300 can be selected such that a patch 300 will cover the entirety of an area that would develop a wrinkle during a gravity sagging reforming process in the absence of the glass-based patch 300.

In embodiments, the one or more glass-based patches 160 can be glass-based patches 310 comprising a ring or frame shape comprising a perimeter band 312 and a hollow center region 314 devoid of glass-based material, such that the glass-based patch 310 does not directly contact the glass-based substrate 110 in the hollow center region 314. In use, perimeter band 312 can be disposed over top perimeter edge 148 of mold cavity 144 and hollow center region 314 can be disposed over mold cavity 144.

In embodiments, the one or more glass-based patches 160 can be glass-based patches 320 that cover the entirety of top surface 112 of glass-based sheet 110.

In embodiments, a plurality of glass-based patches 160 placed on glass-based sheet 110 can comprise one or more patches 300, one or more patches 310, or one or more patches 320. For example, a plurality of glass-based patches 160 placed on glass-based sheet 110 can comprise one or more patches 300 and one or more patches 310. In such embodiments, the one or more patches 300 can be stacked on the one or more patches 310, or vice versa. As another example, a plurality of glass-based patches 160 placed on glass-based sheet 110 can comprise one or more patches 300 and one or more patches 320. In such embodiments, the one or more patches 300 can be stacked on the one or more patches 320, or vice versa.

Figure 4:
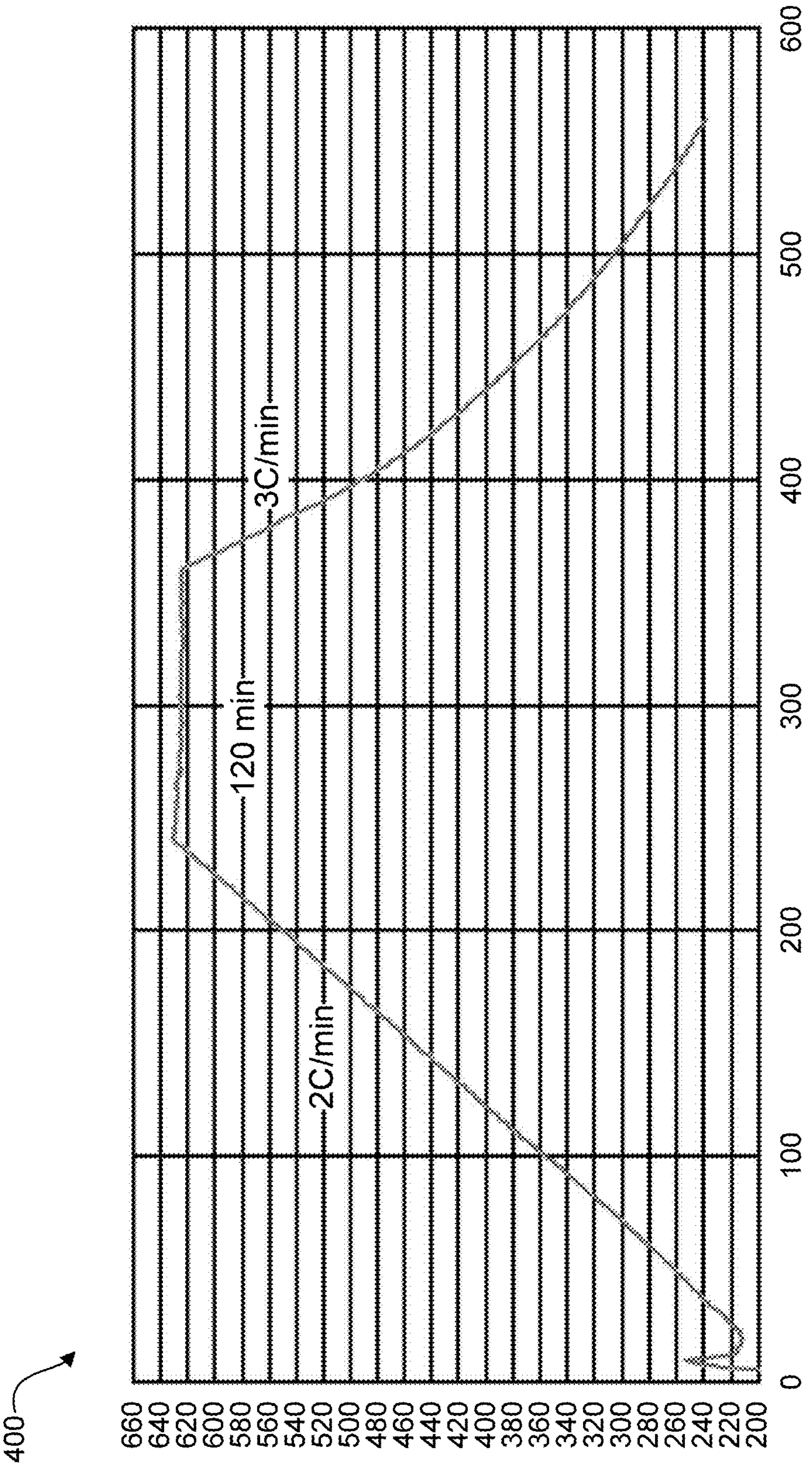
FIG. 4 is a heating profile according to embodiments.

FIG. 4 shows an exemplary heating profile 400 for reforming a glass-based sheet according to embodiments. Heating profile 400 comprises a 2° C. per minute temperature ramp, a reforming temperature of about 620° C., and a 3° C. per minute cooling ramp. For heating profile 400, the glass-based sheet is held at the reforming temperature for 120 minutes.

Figure 5:
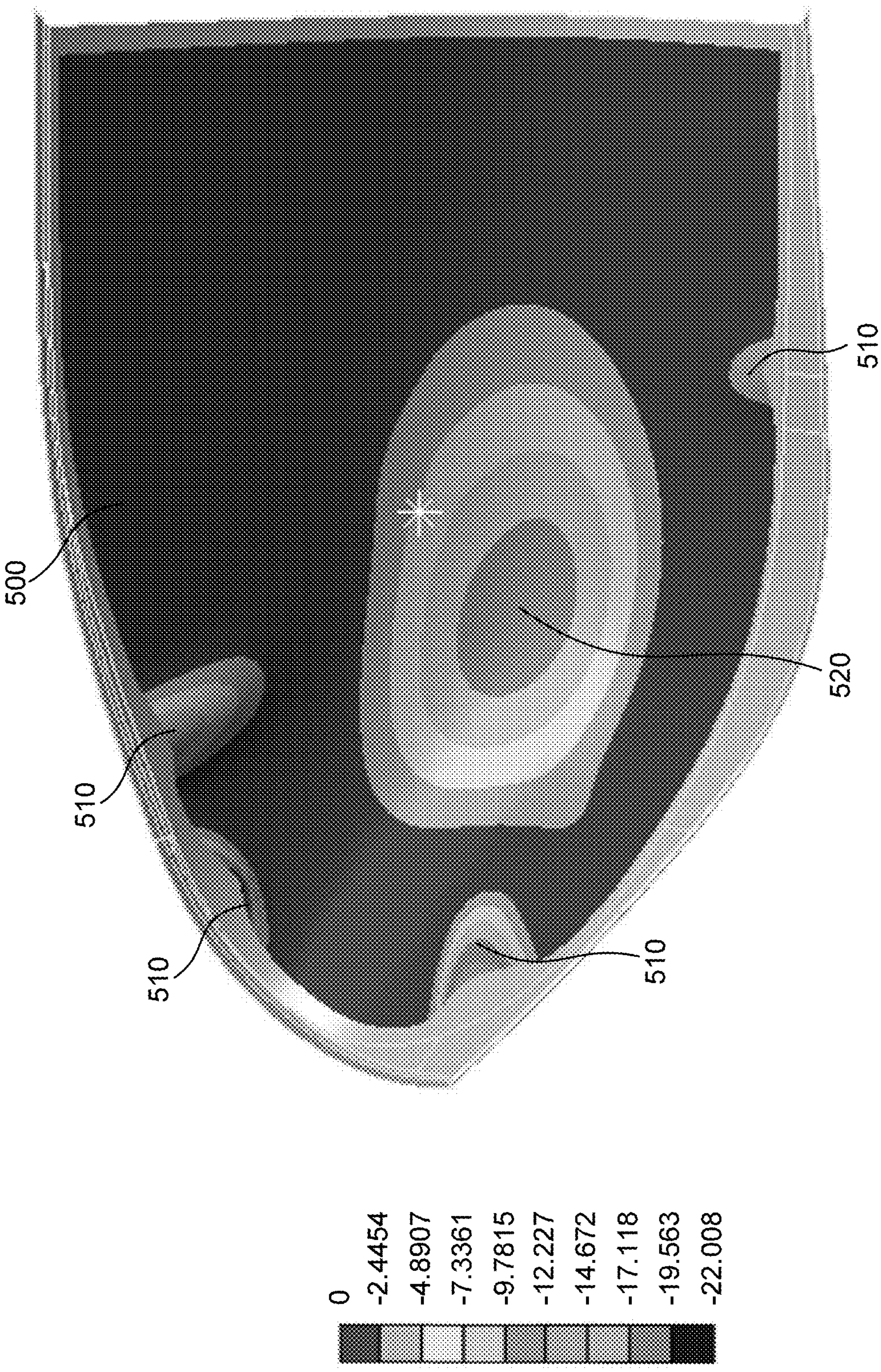
FIG. 5 is a model of a glass-based sheet reformed without glass-based patches.

FIG. 5 shows a modeled reformed glass-based article 500 modeled as being gravity sagged within a mold cavity and without glass-based patches according to embodiments described herein. For the model, the glass-based sheet was scaled down to ⅓ of its actual dimensions and loaded on the top surface of a modeled mold and in contact with the top surface at three points a, b, and c, as shown in FIG. 1. The mold cavity was modeled with a full bottom surface to provide continuous support through the modeled forming process.

As shown in FIG. 5, the modeled glass-based article 500 exhibited wrinkles 510 at four locations distributed along the perimeter edge of the glass-based article 500. The scale in FIG. 5 shows the amount of glass deformation along a vertical axis extending perpendicular to the mold cavity surface. A value of "0" means the glass article 500 is in direct contact with the mold surface and a negative value indicates the glass is above the mold cavity surface. For example, the scale shows negative values for a plurality of wrinkles along the perimeter edge of the glass-based article 500. At the bending moment shown in FIG. 5, the glass-based article 500 is about 10 mm under bending to the target shape, which is indicated by a glass deformation of about negative 10 in area 520.

Figure 6:
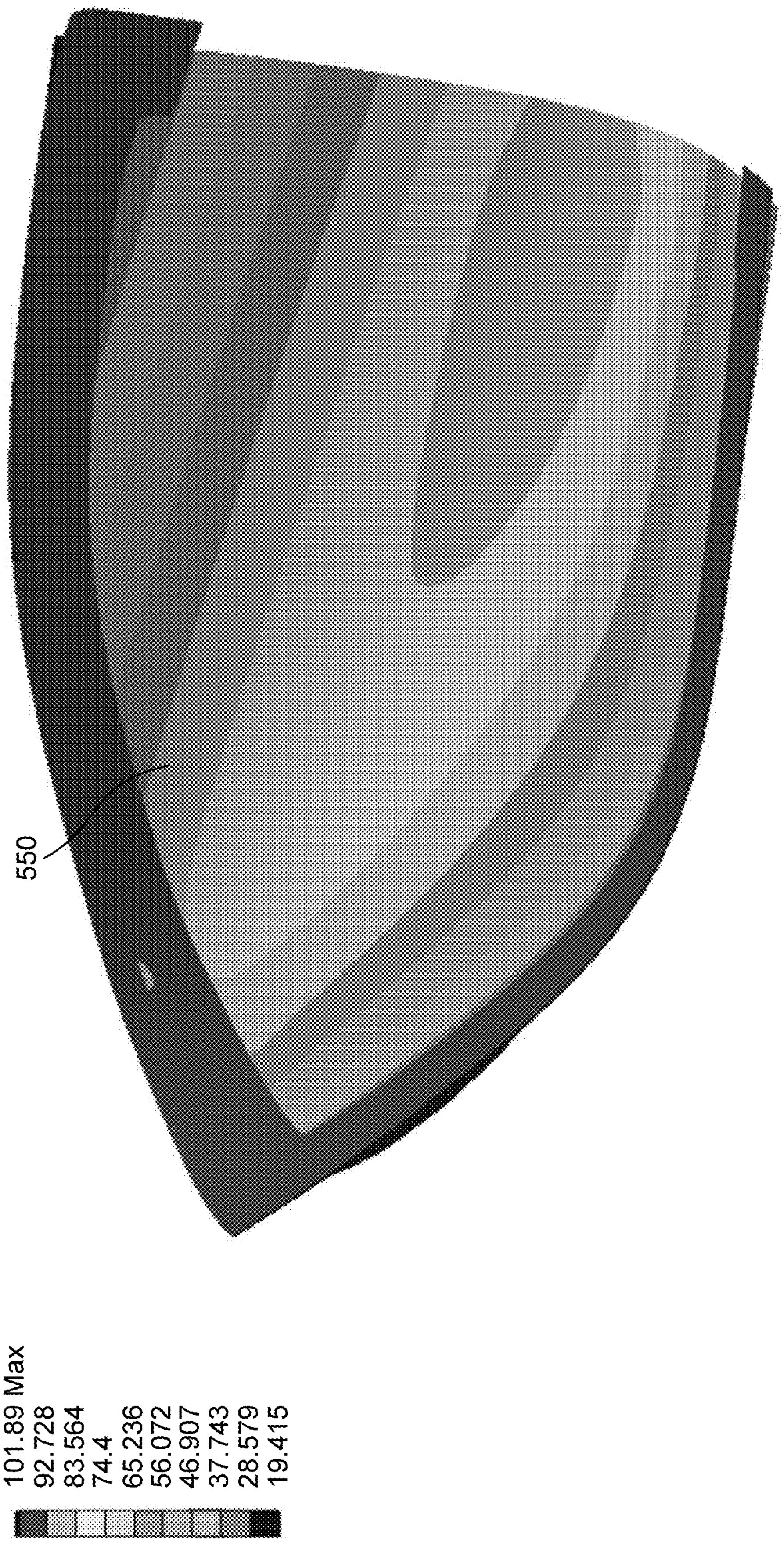
FIG. 6 is a model of a glass-based sheet reformed with glass-based patches.

FIG. 6 shows a modeled reformed glass-based article 550 modeled as being gravity sagged within the same mold cavity as reformed glass-based article 500, but with a continuous glass-based patch covering all the locations at which wrinkles 510 formed in glass-based article 500. As shown in FIG. 6, the glass-based patch helped the glass-based article bend to a deeper depth without exhibiting any edge wrinkling. The scale in FIG. 6 shows the total amount of glass deformation. The amount of deformation across the entire glass-based article conforms to the shape of the mold cavity surface, which indicates the glass-based article was capable of reforming to the desired shape without exhibiting any wrinkling.

The models for both reformed glass-based article 500 and reformed glass-based article 550 were created using Ansys Mechanical FEA Software. Viscoelastic properties of the glass-based articles were modeled by Tool-Narayanaswamy shift function with fictive temperature. The preformed glass articles were modeled as having edge contact with the mold periphery at loading and as being under a gravitational load. Large deformation was activated for modeling nonlinear material behaviors. For glass-based article 550, the continuous glass-based patch was modeled as applying the weight of the patch to article 550 as a mechanical load.

Figure 7:
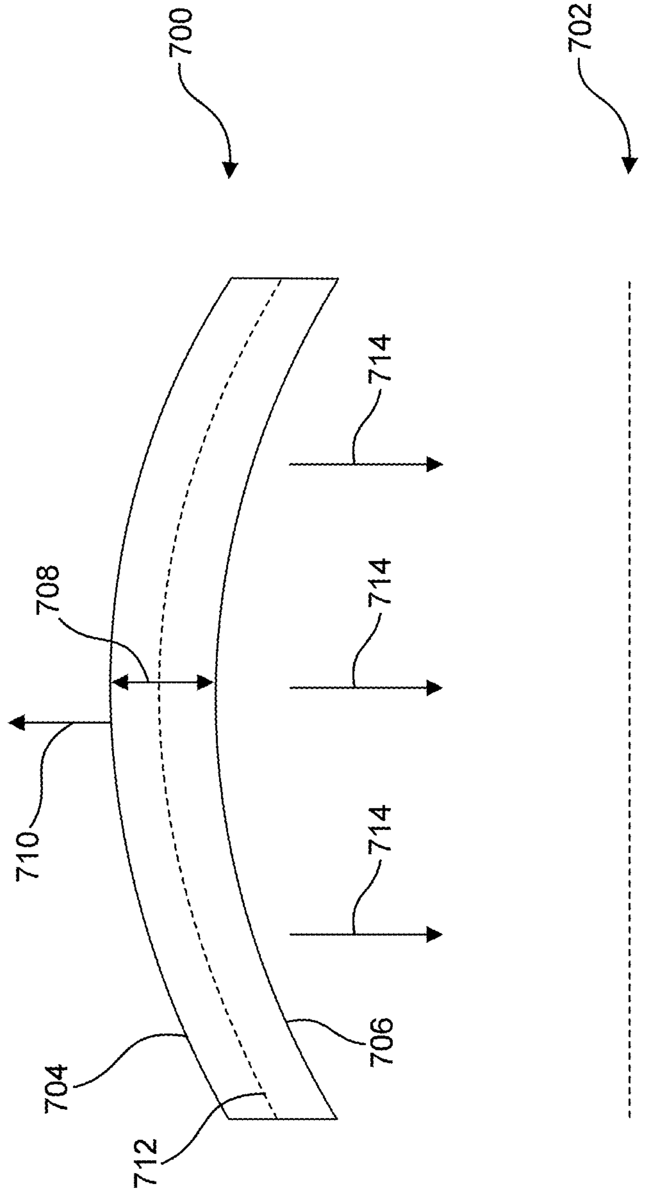
FIG. 7 illustrates a reformed glass-based article according to embodiments.

After reforming according to embodiments described herein, glass-based sheet 110 can define a glass-based article having a desired shape. FIG. 7 shows a cross-sectional view of a reformed glass-based article 700 according to embodiments. Reformed glass-based article 700 comprises a non-developable curved shape defined by a first curved surface 704 and a second curved surface 706. In embodiments, the first curved surface 704 can be the bottom surface 114 of glass-based sheet 110 reformed to have a convex curved surface. In embodiments, the second curved surface 706 can be the top surface 112 of glass-based sheet 110 reformed to have a concave curved surface. Reformed glass-based article 700 can comprise any number of convex or concave surfaces defining first curved surface 704 and a second curved surface 706.

FIG. 7 shows reformed glass-based article 700 and an imaginary surface 702, according to an example embodiment. In embodiments, the imaginary surface 702 represents an imaginary plane that points contained in an imaginary central surface 712 defined by the glass-based article 700 can be displaced into, as signified by the arrows 714, during a simulation to determine a complexity of the curved shape of the glass-based article 700. The reforming techniques described herein are capable of producing glass-based articles having higher complexity than certain preexisting hot-forming techniques, with the glass-based article 700 beneficially exhibiting high thickness uniformity and relatively low levels of optical distortion.

As shown, the glass-based article 700 comprises the first curved surface 704, the second curved surface 706, and a thickness 708 extending between the first curved surface 704 and the second curved surface 706. In embodiments, the first curved surface 704 and the second curved surface 706 define a non-developable curved shape of the glass-based article 700. In embodiments, the thickness 708 represents a distance between the first curved surface 704 and the second curved surface 706 along a direction 710 extending perpendicular to the first curved surface 704. As will be appreciated, the direction 710 in which the thickness 708 is measured can vary as a function of position on the first curved surface 704 given the non-developable curved shape. In embodiments, the thickness 708 can correspond to a minimum distance from the first curved surface 704 to the second curved surface 706, as measured from a particular point on the first curved surface 704.

In embodiments, thickness 708 can range from 0.25 millimeters to 4 millimeters, from 0.5 millimeters to 4 millimeters, from 0.7 millimeters to 4 millimeters, from 1 millimeter to 4 millimeters, from 2 millimeters to 4 millimeters, or within a range having any two of these values as endpoints. In embodiments, thickness 1408 can range from 0.1 millimeters to 10 millimeters, from 0.2 millimeters to 10 millimeters, from 0.3 millimeters to 10 millimeters, from 0.4 millimeters to 10 millimeters, from 0.5 millimeters to 10 millimeters, from 0.6 millimeters to 10 millimeters, from 0.7 millimeters to 10 millimeters, from 0.8 millimeters to 10 millimeters, from 0.9 millimeters to 10 millimeters, from 1 millimeter to 10 millimeters, from 1.1 millimeters to 10 millimeters, from 1.2 millimeters to 10 millimeters, from 1.4 millimeters to 10 millimeters, from 1.5 millimeters to 10 millimeters, from 1.6 millimeters to 10 millimeters, from 1.8 millimeters to 10 millimeters, from 2 millimeters to 10 millimeters, from 2.1 millimeters to 10 millimeters, from 2.5 millimeters to 10 millimeters, from 3 millimeters to 10 millimeters, from 4 millimeters to 10 millimeters, from 5 millimeters to 10 millimeters, from 0.1 millimeters to 9 millimeters, from 0.1 millimeters to 8 millimeters, from 0.1 millimeters to 7 millimeters, from 0.1 millimeters to 6.5 millimeters, from 0.1 millimeters to 6 millimeters, from 0.1 millimeters to 5 millimeters, from 0.1 millimeters to 4 millimeters, from 0.5 millimeters to 4 millimeters, from 0.7 millimeters to 4 millimeters, from 0.7 millimeters to 3.5 millimeters, from 0.7 millimeters to 3 millimeters, from 0.7 millimeters to 2.5 millimeters, or from 0.7 millimeters to 2 millimeters, or within a range having any two of these values as endpoints.

The value obtained when measuring the thickness 708 can vary depending on the location on the first curved surface 704.

In embodiments, the first curved surface 704 and/or the second curved surface 706 can have a surface area of 10,000 $mm^2$ or more, 20,000 $mm^2$ or more, 30,000 $mm^2$ or more, or 60,000 $mm^2$ or more. In embodiments, the first curved surface 704 and/or the second curved surface 706 can have a surface area ranging from 10,000 $mm^2$ to 6 $mm^2$, from 20,000 $mm^2$ to 6 $mm^2$, from 30,000 $mm^2$ to 6 $mm^2$, or from 60,000 $mm^2$ to 6 $mm^2$.

In embodiments, the curved shape of reformed glass-based article 700 defined by first curved surface 704 and second curved surface 706 can have a thickness uniformity of +/−x microns (micrometers, μm) per 100 mm. A thickness uniformity of +/−x microns per 100 mm means that the maximum thickness variation of reformed glass-based article 700 is no more than x microns along a curved surface portion measuring 100 millimeters in length. In embodiments, the curved shape of reformed glass-based article 700 defined by the convex surface and the concave surface can have a thickness uniformity of +/−50 microns per 100 mm. In embodiments, the curved shape of reformed glass-based article 700 defined by the convex surface and the concave surface can have a thickness uniformity of +/−25 microns per 100 mm. In embodiments, the curved shape of reformed glass-based article 700 defined by the convex surface and the concave surface can have a thickness uniformity of +/−75 microns per 100 mm.

In embodiments, the curved shape of reformed glass-based article 700 defined by first curved surface 704 and second curved surface 706 can have a convex surface area of 60,000 $mm^2$ or more and a thickness uniformity of +/−25 microns per 100 mm. In embodiments, the curved shape of reformed glass-based article 700 can have a convex surface area ranging from 60,000 $mm^2$ to 8 $m^2$ (meters squared) and a thickness uniformity of +/−25 microns per 100 mm. In embodiments, the curved shape of reformed glass-based article 700 can have a convex surface area ranging from 60,000 $mm^2$ to 6 $m^2$ and a thickness uniformity of +/−25 microns per 100 mm. In embodiments, the curved shape of reformed glass-based article 700 can have a convex surface area ranging from 60,000 $mm^2$ to 3 $m^2$ and a thickness uniformity of +/−25 microns per 100 mm.

In embodiments, the curved shape of reformed glass-based article 700 defined by first curved surface 704 and second curved surface 706 can have a convex surface area of 60,000 $mm^2$ or more and a thickness uniformity of +/−50 microns per 100 mm. In embodiments, the curved shape of reformed glass-based article 700 can have a convex surface area ranging from 60,000 $mm^2$ to 8 $m^2$ and a thickness uniformity of +/−50 microns per 100 mm. In embodiments, the curved shape of reformed glass-based article 700 can have a convex surface area ranging from 60,000 $mm^2$ to 6 $m^2$ and a thickness uniformity of +/−50 microns per 100 mm. In embodiments, the curved shape of reformed glass-based article 700 can have a convex surface area ranging from 60,000 $mm^2$ to 3 $m^2$ and a thickness uniformity of +/−50 microns per 100 mm.

In embodiments, the curved shape of reformed glass-based article 700 defined by first curved surface 704 and second curved surface 706 can have a convex surface area of 60,000 $mm^2$ or more and a thickness uniformity of +/−75 microns per 100 mm. In embodiments, the curved shape of reformed glass-based article 700 can have a convex surface area ranging from 60,000 $mm^2$ to 8 $m^2$ and a thickness uniformity of +/−75 microns per 100 mm. In embodiments, the curved shape of reformed glass-based article 700 can have a convex surface area ranging from 60,000 $mm^2$ to 6 $m^2$ and a thickness uniformity of +/−75 microns per 100 mm. In embodiments, the curved shape of reformed glass-based article 700 can have a convex surface area ranging from 60,000 $mm^2$ to 3 $m^2$ and a thickness uniformity of +/−75 microns per 100 mm.

In embodiments, the curved shape of reformed glass-based article 700 defined by first curved surface 704 and second curved surface 706 can have an optical power distortion measured through thickness 708 below 300 millidiopters in absolute value. In embodiments, the curved shape of reformed glass-based article 700 can have an optical power distortion measured through thickness 708 ranging from 20 millidiopters to 300 millidiopters (in absolute value). In embodiments, the curved shape of reformed glass-based article 700 can have an optical power distortion measured through thickness 708 ranging from 50 millidiopters to 300 millidiopters (in absolute value). In embodiments, the curved shape of reformed glass-based article 700 can have an optical power distortion measured through thickness 708 ranging from 100 millidiopters to 300 millidiopters (in absolute value). The optical power distortion of the curved shape can be measured in accordance with DIN 52305:1995 ("Determining the optical distortion and refractive power of safety glazing material for road vehicles").

In embodiments, a first curved surface 704 of reformed glass-based article 700 can have a measurable dimple density of less than 10 dimples per 100 $mm^2$ convex surface area. As used herein, a measurable dimple is a raised or recessed dimple formed on the first curved surface 704 and comprising an effective diameter of greater than 1 mm and no greater than 5 mm. Measurable dimples can be identified by measuring optical distortion of light transmitted through the first curved surface 704 of a glass-based article. An optical distortion of 50 or more millidiopters (mdpt) after a noise filter is applied to the measurement data can indicate the presence of a measurable dimple, or an optical distortion of 100 or more millidiopters (mdpt) before a noise filter is applied to the measurement data can indicate the presence of a measurable dimple. Optical distortion can be measured using a device that measures transmitted optical distortions on glass. For example, optical distortion can be measured using a LABSCAN-SCREEN system available from ISRA Vision. For purposes of evaluating a measurable dimple density, at least one 50,000 $mm^2$ surface area on first curved surface 704 is analyzed and the number of measurable dimples per 100 $mm^2$ is calculated based on the total number of measurable dimples present. To confirm the accuracy of the number of dimples per 100 $mm^2$ for the 50,000 $mm^2$ surface area, a 5,000 $mm^2$ surface area inside the 50,000 $mm^2$ surface area can be re-analyzed and the number of measurable dimples per 100 $mm^2$ is calculated based on the total number of measurable dimples present in the 5,000 $mm^2$ surface area.

The reforming methods described herein facilitate thickness 708 being substantially uniform over the entire first curved surface 704. For example, if a plurality of measurements of the thickness 708 (e.g., 10 measurements) are taken over a particular 1000 $mm^2$ portion of the surface area of the first curved surface 704, the measurements can all be within 150 μm of one another (e.g., such that a difference between a maximum value of the values obtained and a minimum value is less than or equal to 150 μm). That is, the thickness uniformity of the glass-based article 700 can be +/−75 microns per 1000 $mm^2$ of surface area on the first curved surface 704. In embodiments, the thickness uniformity of the glass-based article 700 can be +/−75 microns per 10000 $mm^2$ of surface area on the first curved surface 704. In embodiments, the thickness uniformity is +/−50 microns per 1000 $mm^2$ of surface area on the first curved surface 704. In embodiments, the thickness uniformity is +/−25 microns per 1000 $mm^2$ of surface area on the first curved surface 704.

In embodiments, at least one of the first curved surface 704 and the second curved surface 706 comprises a surface area in the range of 60,000 $mm^2$ or more and a thickness uniformity of +/−75 microns per 1000 $mm^2$. In embodiments, at least one of the first curved surface 704 and the second curved surface 706 comprises a surface area in the range of 60,000 $mm^2$ to 6 $m^2$ and a thickness uniformity of +/−75 microns per 1000 $mm^2$. In embodiments, at least one of the first curved surface 704 and the second curved surface 706 comprises a surface area in the range of 60,000 $mm^2$ to 6 $m^2$ and a thickness uniformity of +/−75 microns per 10,000 $mm^2$. In embodiments, at least one of the first curved surface 704 and the second curved surface 706 comprises a surface area in the range of 60,000 $mm^2$ to 6 $m^2$ and a thickness uniformity of +/−50 microns per 10,000 $mm^2$. In embodiments, at least one of the first curved surface 704 and the second curved surface 706 comprises a surface area in the range of 60,000 $mm^2$ to 6 $m^2$ and a thickness uniformity of +/−25 microns per 10,000 $mm^2$.

In embodiments, the non-developable curved shape defined by the first curved surface 704 and the second curved surface 706 comprises a maximum compressive strain shape parameter, defined by the imaginary central surface 712 of the glass-based article 700 and the imaginary surface 702. The maximum compressive strain shape parameter represents a complexity of the shape into which the processes described herein are capable of reforming flat glass-based sheets without introducing wrinkling or other significant thickness deviations. The maximum compressive strain shape parameter is primarily a function of the Gaussian curvature associated with the imaginary central surface 712 and the dimensions thereof (e.g., a length and a width in an assigned coordinate system). The thickness of the glass has a minor effect on the maximum compressive strain shape parameter, but the effect is negligible.

The maximum compressive strain shape parameter can be computed by simulating the imaginary central surface 712 as an imaginary glass-based sheet. The properties of the imaginary glass-based sheet can be independent of the properties of the actual glass-based article 700 (physically produced via the methods described herein). In an example, the imaginary glass-based sheet has a thickness of 0.7 mm, a Young's modulus of 71.7 GPa, and a Poisson's ratio of 0.21, and a density of 2440 $kg/m^3$. The imaginary glass-based sheet is discretized into trilateral or quadrilateral shell elements (or a combination thereof) associated with a commercially available finite element analyzer. In embodiments, ANSYS® MECHANICAL™ is used to compute the maximum compressive strain shape parameter, with the imaginary central surface 712 being discretized using SHELL181 elements (avoiding use of the degenerate triangular option, except when used as a filler in mesh generation). Particularly, a simulation is conducted of the strains that would be present in the imaginary glass-based sheet when the imaginary glass-based sheet (initially having the shape of the imaginary central surface 712) is flattened to have the planar shape of the imaginary surface 702. A command script is used to assign boundary conditions associated with the nodal displacements of the simulation (e.g., to define the imaginary surface 702 for flattening the imaginary glass-based sheet). The boundary conditions can also prevent rigid body motion of the imaginary glass-based shect (e.g., by assigning the imaginary surface 702 to be tangent to a portion of the imaginary central surface 712). Nodes associated with each shell element are displaced along the arrows 714 until the nodes are each located on the imaginary surface 702 (e.g., the z-coordinates of each of the nodes are zeroed out in the coordinate system established by the boundary conditions, without the x or y coordinates of each node changing, such that the length and width of the simulated flattened glass sheet is the same as that of the initial glass-based article 700 being simulated). The finite element analysis is carried out using the implicit method, including nonlinear analysis. The maximum value of the major principle strain is the maximum compressive strain shape parameter described herein. The mesh size associated with the shell elements is less than or equal to 0.5 mm to ensure a convergent solution.

The imaginary central surface 712 is a surface representing a central plane of the glass-based article 700. Each point on the imaginary central surface 712 is equidistant from the first curved surface 704 and the second curved surface 706 along a direction extending perpendicular to the imaginary central surface 712 at that point.

Certain existing gravity sagging methods may not be capable of producing glass-based articles having non-developable shapes with a maximum compressive strain parameter of greater than 1% or 2% without substantial defects or thickness variations. The gravity sagging methods described herein, in contrast, are able to reform flat glass-based sheets to curved glass-based articles with curved surfaces defining a non-developable shape with a maximum compressive strain shape parameter of greater than or equal to 3.0% (e.g., greater than or equal to 3.5%, greater than or equal to 4.0%, greater than or equal to 4.5%, greater than or equal to 5.0%). In embodiments, the curved glass-based articles can have curved surfaces defining a non-developable shape with such maximum compressive strain shape parameter ranges while still exhibiting a thickness uniformity of +/−75 pm (e.g., +/−50 pm, +/−25 pm) per at least 1000 $mm^2$ of surface area of the part.

In embodiments, the maximum compressive strain shape parameter associated with the glass-based article 700 can be approximated using the following equation when the glass-based article has a periphery that is substantially parallelepiped shaped (or in cases where a majority of the periphery of the glass-based article has a radius of curvature of greater than 10 m):

$$MCSSP = 0.0725 * k * \left(1.0667 - 10.9477 * e^{-3.3572 * \frac{w}{l}}\right) * l^2 \qquad (1)$$

where k is an average Gaussian curvature of the imaginary central surface 712, 1 is a length of a flat glass-based sheet that the imaginary glass-based sheet is simulated to be flattened into, and w is a width of the flat glass-based sheet (units of each constant are such that the result is in units of mm/m, which can be converted to a percent by dividing the numerical mm/m result by 10). When the glass-based article comprises a substantially circular (or where a majority of the periphery of the glass-based article has a radius of curvature of less than 10 m), the maximum compressive strain shape parameter can be approximated mathematically based on the following relationship:

$$MCSSP = 0.0354 * k * D^2 \qquad (2)$$

where D is the diameter of the circular glass plate that the imaginary glass-based sheet is flattened into. Units associated with the constants in equations (1) and (2) are set such that the output of equations (1) and (2) are in the units of mm/m (which can be converted to a percent by dividing the output by 10).

In embodiments, the curved shape of reformed glass-based article 700 can have an optical power distortion measured through the thickness 708 below 300 millidiopters in absolute value. In embodiments, the curved shape of reformed glass-based article 700 can have an optical power distortion measured through the thickness 708 ranging from 20 millidiopters to 300 millidiopters (in absolute value). In embodiments, the curved shape of reformed glass-based article 700 can have an optical power distortion measured through the thickness 708 ranging from 50 millidiopters to 300 millidiopters (in absolute value). In embodiments, the curved shape of reformed glass-based article 700 can have an optical power distortion measured through the thickness 708 ranging from 100 millidiopters to 300 millidiopters (in absolute value). The optical power distortion of the curved shape can be measured in accordance with DIN 52305:1995 ("Determining the optical distortion and refractive power of safety glazing material for road vehicles").

As will be appreciated, the glass-based article 700 can have a variety of shapes and the particular form of the glass-based article 700 is not particularly limiting. For example, in embodiments, an outer peripheral shape of the glass-based article 700 can comprise a length (L) extending in a first direction extending parallel to the imaginary surface 702 and a width (W) extending in a second direction parallel to the imaginary surface 702 and perpendicular to the first direction. The length (L) and width (W) can represent the maximum dimensions of the glass-based article 700 in the first and second directions, respectively. In embodiments, an outer peripheral edge of the glass-based article 700 can be substantially parallelepiped (e.g., rectangular) shaped. In embodiments, the outer peripheral edge of the glass-based article 700 can be substantially circular-shaped (e.g., such that a majority of the peripheral edge possesses radius of curvature of less than 10 m) and comprise a diameter (D) representing a maximum distance between two points on the outer peripheral edge.

The gravity sagging forming techniques described herein can also be used to co form (e.g., co shape, co-sag) multiple glass-based sheets such that each of the glass-based sheets comprises a complex curved shape, as described with the respect to the glass-based article depicted in FIG. 7. Co-forming multiple glass-based sheets simultaneously beneficially facilitates reforming the glass-based sheets conforming with one another in shape, facilitating formation of high-quality laminate components (e.g., for windshields, side windows, safety glass, or any other component including a plurality of glass sheets laminated to one another). The gravity sagging reforming techniques described herein can be particularly beneficially when forming glass-based articles having an extreme gaussian 3D shape (e.g., such that one or more of the curved glass-based sheets comprises a maximum compressive strain shape parameter of 3.0% or more).

EXAMPLES

Embodiments of the present disclosure can be further understood in view of the following examples.

Glass-based sheets were reformed into glass-based articles comprising a non-developable curvature according to a gravity sagging process as described herein using heating profile 400 and various glass-based patches as summarized below in Table 1. The glass composition used for the glass-based sheets and the glass-based patches was the same. The glass composition was a floated soda lime glass

TABLE 1

| Example No. | Number of Sheets | Total Thickness (mm) | Process | Non-stick Agent |
|---|---|---|---|---|
| 1 | 2 | 3.1 | Gravity sagging + patch x1 | Graphite spray |
| 2 | 1 | 1.1 | Gravity sagging + patch x3 | HBN |
| 3 | 1 | 1.1 | Gravity sagging + patch x3 | HBN |
| 4 | 1 | 1.1 | Gravity sagging + patch + inox | Graphite spray |
| 5 | 2 | 3.1 | Edges finished (600 grid manual bezel) | Graphite spray |

For each example, the glass-based sheet was loaded on the top surface of a mold with three-point support as shown in FIG. 1. The number of sheets listed in Table 1 is the number of stacked glass-based sheets in the glass-based sheet reformed in each example. The total thickness listed is the thickness of the glass-based sheet reformed. In each example, local glass-based patches were placed on the four areas of the glass-based sheet that exhibited a wrinkle in modeled glass-based sheet 500. Each of the local patches were sized and shaped to cover the entirety of an area that exhibited a wrinkle in modeled glass-based sheet 500. In process "Gravity sagging+patch x1," the glass-based patches used were single layer glass-based patches having a thickness of 2 mm. In process "Gravity sagging+patch x3," the glass-based patches used were multi-layer glass-based patches with three stacked patches and having a total thickness of 6 mm. In process "Gravity sagging+patch+inox," the glass-based patches used were single layer glass-based patches having a thickness of 5 mm with an additional 2 millimeter thick sheet of stainless steel stacked on top of each patch to add additional weight. In process "Edges finished (600 grid manual bezel)," the glass-based patches used were single layer glass-based patches having a thickness of 2 mm and a beveled perimeter edge. The non-stick agent listed was applied to the bottom surface of the glass-based patches in each example. After reforming, none of Example Nos. 1-5 exhibited a wrinkle.

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "embodiments," "an embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

The indefinite articles "a" and "an" to describe an element or component means that one or more than one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

Directional terms as used herein—for example up, down, right, left, front, back, top, bottom, inward, outward—are made only with reference to the figures as drawn and are not intended to imply absolute orientation.

As used in the claims, "comprising" is an open-ended transitional phrase. A list of elements following the transitional phrase "comprising" is a non-exclusive list, such that elements in addition to those specifically recited in the list may also be present. As used in the claims, "consisting essentially of" or "composed essentially of" limits the composition of a material to the specified materials and those that do not materially affect the basic and novel characteristic(s) of the material. As used in the claims, "consisting of" or "composed entirely of" limits the composition of a material to the specified materials and excludes any material not specified.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

The present embodiment(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. A method for reforming a glass-based sheet, the method comprising:

placing a glass-based sheet over a mold, the mold comprising: a mold cavity, and a top surface defining a top perimeter edge of the mold cavity;

placing a glass-based patch on a top surface of the glass-based sheet; and heating the glass-based sheet and the glass-based patch to a reforming temperature such that the glass-based sheet and the glass-based patch deform into the mold cavity under gravitational force, wherein after deforming under the gravitational force, the glass-based patch comprises:

a first portion disposed over the top surface of the mold and conforming to a shape of the top surface of the mold, and a second portion bent over the top perimeter edge of the mold cavity and disposed on the top surface of the glass-based sheet within the mold cavity, wherein one or more of:

the first portion of the glass-based patch is mechanically fixed relative to the top surface of the mold, a bottom surface of the glass-based patch comprises a RMS surface roughness of greater than or equal to 10 microns, and the glass-based patch comprises a perimeter band disposed over the top perimeter edge of the mold cavity and a hollow center region disposed over the mold cavity.

2. The method of claim 1, wherein the bottom surface of the glass-based patch is not fixed to the top surface of the glass-based sheet such that the glass-based sheet and the glass-based patch can deform independently during reforming.

3. The method of claim 1, wherein the first portion of the glass-based patch is mechanically fixed relative to the top surface of the mold.

4. The method of claim 1, wherein the first portion of the glass-based patch is mechanically fixed relative to the top surface with a wire secured to the mold and the first portion.

5. The method of claim 1, wherein the bottom surface of the glass-based patch comprises a RMS surface roughness of greater than or equal to 10 microns.

6. The method of claim 1, wherein the glass-based sheet and the glass-based patch are formed of the same glass composition.

7. The method of claim 1, wherein the glass-based sheet is formed of a first glass composition comprising a first glass transition temperature and the glass-based patch is formed of a second glass composition comprising a second glass transition temperature, and wherein the first glass transition temperature is equal to the second glass transition temperature +/−10° C.

8. The method of claim 1, wherein the glass-based sheet is formed of a first glass composition comprising a first coefficient of thermal expansion and the glass-based patch is formed of a second glass composition comprising a second coefficient of thermal expansion, and wherein the first coefficient of thermal expansion is equal to the second coefficient of thermal expansion +/−10×$10^{-7}$/° C.

9. The method of claim 1, wherein, before heating the glass-based sheet, a perimeter edge of the glass-based sheet comprises a first edge portion disposed over the top surface of the mold and a second edge portion disposed over the mold cavity, wherein the glass-based patch is disposed on the top surface of the glass-based sheet on at least one of the first edge portion and the second edge portion.

10. The method of claim 1, comprising:

placing a plurality of the glass-based patches on the top surface of the glass-based sheet; and heating the plurality of glass-based patches to the reforming temperature such that each of the glass-based patches deforms into the mold cavity under gravitational force, wherein after deforming under the gravitational force, each glass-based patch comprises:

a first portion disposed over the top surface of the mold, and a second portion bent over the top perimeter edge of the mold cavity and disposed on the top surface of the glass-based sheet within the mold cavity.

11. The method of claim 10, wherein the plurality of glass-based patches are positioned at different locations over the top perimeter edge of the mold cavity.

12. The method of claim 1, wherein the glass-based patch comprises the perimeter band disposed over the top perimeter edge of the mold cavity and the hollow center region disposed over the mold cavity.

13. The method of claim 1, wherein the glass-based patch is sized and positioned such that it is disposed on the top surface of the glass-based sheet at a portion of the glass-based sheet that would develop a wrinkle during the reforming method in the absence of the glass-based patch.

14. The method of claim 1, wherein:

after deforming under the gravitational force, the glass-based sheet defines a glass-based article comprising a non-developable curved shape defined by a first curved surface and a second curved surface;

at least one of the first curved surface and the second curved surface comprises a surface area of 60,000 $mm^2$ or more; and a thickness of the glass-based article, measured as a distance between the first curved surface and the second curved surface in a direction perpendicular to the first curved surface, has a uniformity of +/−75 microns per 1000 $mm^2$ of surface area on the first curved surface.

15. The method of claim 14, wherein the non-developable curved shape comprises a maximum compressive strain shape parameter, as measured between an imaginary central surface disposed between the first curved surface and the second curved surface and an imaginary surface, of greater than or equal to 3.0%.

16. A method for reforming a glass-based sheet, the method comprising:

placing a glass-based sheet over a mold, the mold comprising: a mold cavity, and a top surface defining a top perimeter edge of the mold cavity;

placing a glass-based patch on a top surface of the glass-based sheet; and heating the glass-based sheet and the glass-based patch to a reforming temperature such that the glass-based sheet and the glass-based patch deform into the mold cavity under gravitational force, wherein after deforming under the gravitational force, the glass-based patch comprises:

a first portion disposed over the top surface of the mold and conforming to a shape of the top surface of the mold, and a second portion bent over the top perimeter edge of the mold cavity and disposed on the top surface of the glass-based sheet within the mold cavity, wherein, before heating the glass-based sheet, a perimeter edge of the glass-based sheet comprises a first edge portion disposed over the top surface of the mold and a second edge portion disposed over the mold cavity, and wherein the glass-based patch is disposed on the top surface of the glass-based sheet on at least one of the first edge portion and the second edge portion.

17. A method for reforming a glass-based sheet, the method comprising:

placing a glass-based sheet over a mold, the mold comprising: a mold cavity, and a top surface defining a top perimeter edge of the mold cavity;

placing a glass-based patch on a top surface of the glass-based sheet; and heating the glass-based sheet and the glass-based patch to a reforming temperature such that the glass-based sheet and the glass-based patch deform into the mold cavity under gravitational force, wherein after deforming under the gravitational force, the glass-based patch comprises:

a first portion disposed over the top surface of the mold and conforming to a shape of the top surface of the mold, and a second portion bent over the top perimeter edge of the mold cavity and disposed on the top surface of the glass-based sheet within the mold cavity, wherein:

after deforming under the gravitational force, the glass-based sheet defines a glass-based article comprising a non-developable curved shape defined by a first curved surface and a second curved surface;

at least one of the first curved surface and the second curved surface comprises a surface area of 60,000 $mm^2$ or more; and a thickness of the glass-based article, measured as a distance between the first curved surface and the second curved surface in a direction perpendicular to the first curved surface, has a uniformity of +/−75 microns per 1000 $mm^2$ of surface area on the first curved surface.

* * * * *